US012682884B2

(12) United States Patent
Chen

(10) Patent No.: US 12,682,884 B2
(45) Date of Patent: Jul. 14, 2026

(54) METHODS AND APPARATUS TO CONVERT IMAGE TO AUDIO

(71) Applicant: Intel Corporation, Santa Clara, CA (US)

(72) Inventor: Liu Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/148,189

(22) Filed: Dec. 29, 2022

(65) Prior Publication Data

US 2023/0134984 A1 May 4, 2023

Related U.S. Application Data

(60) Provisional application No. 63/417,224, filed on Oct. 18, 2022.

(51) Int. Cl.
*G10L 13/027* (2013.01)
*G06N 3/0455* (2023.01)
*G10L 13/08* (2013.01)

(52) U.S. Cl.
CPC .......... *G10L 13/027* (2013.01); *G06N 3/0455* (2023.01); *G10L 13/08* (2013.01)

(58) Field of Classification Search
CPC ..... G10L 13/027; G10L 13/08; G10L 13/047; G10L 2013/105; G10L 13/10; G06N 3/0455; G06N 3/048; G06N 3/082; G06N 3/09; G06N 3/047; G06N 3/084
See application file for complete search history.

(56) References Cited

U.S. PATENT DOCUMENTS

| | | | |
|---|---|---|---|
| 8,451,248 | B1 | 5/2013 | Kim |
| 8,743,072 | B2 | 6/2014 | Kim |
| 8,760,421 | B2 | 6/2014 | Jordan et al. |
| 9,195,328 | B2 | 11/2015 | Jordan et al. |
| 9,280,206 | B2 | 3/2016 | Nagar et al. |
| 9,304,683 | B2 | 4/2016 | Paek et al. |
| 9,367,134 | B2 | 6/2016 | Kim |
| 9,507,561 | B2 | 11/2016 | Mckiel, Jr. |
| 9,547,375 | B2 | 1/2017 | Paek et al. |
| 9,547,430 | B2 | 1/2017 | Paek et al. |

(Continued)

OTHER PUBLICATIONS

Chen et al., "An End-to-End Neural Network for Image-to-Audio Transformation," ICASSP 2023—2023 IEEE International Conference on Acoustics, Speech and Signal Processing (ICASSP), Rhodes Island, Greece, Jun. 4-10, 2023, 5 pages.

(Continued)

*Primary Examiner* — Huyen X Vo
(74) *Attorney, Agent, or Firm* — Akona IP PC

(57) ABSTRACT

Methods, apparatus, systems, and articles of manufacture are disclosed. An example apparatus includes: An apparatus comprising: at least one memory; instructions; and processor circuitry to execute the instructions to: processor circuitry to execute the instructions to: identify a word in an image, the word to be converted to an audio waveform; encode the word identified in the image into an ordered list of phonemes; and synthesize the audio waveform of the word based on an output of a neural network that determines a duration that a phoneme of the ordered list of phonemes is to be expressed in the audio waveform.

20 Claims, 10 Drawing Sheets

(56) References Cited

U.S. PATENT DOCUMENTS

| | | | |
|---|---|---|---|
| 9,684,448 B2 | 6/2017 | Dagar | |
| 9,740,399 B2 | 8/2017 | Paek et al. | |
| 9,939,903 B2 | 4/2018 | Kim | |
| 10,032,072 B1 | 7/2018 | Tran et al. | |
| 10,489,054 B2 | 11/2019 | Paek et al. | |
| 10,628,025 B2 | 4/2020 | White et al. | |
| 10,628,121 B2 | 4/2020 | Park et al. | |
| 10,949,736 B2 | 3/2021 | Deisher et al. | |
| 10,996,851 B2 | 5/2021 | Paek et al. | |
| 2006/0123220 A1 | 6/2006 | Colson | |
| 2008/0168364 A1 | 7/2008 | Miller | |
| 2013/0050097 A1 | 2/2013 | Jordan et al. | |
| 2014/0049491 A1 | 2/2014 | Nagar et al. | |
| 2014/0092037 A1 | 4/2014 | Kim | |
| 2014/0098024 A1 | 4/2014 | Paek et al. | |
| 2014/0098036 A1 | 4/2014 | Paek et al. | |
| 2014/0098038 A1 | 4/2014 | Paek et al. | |
| 2014/0101545 A1 | 4/2014 | Paek et al. | |
| 2014/0101593 A1 | 4/2014 | Paek et al. | |
| 2014/0192003 A1 | 7/2014 | Kim | |
| 2014/0240270 A1 | 8/2014 | Jordan et al. | |
| 2014/0281950 A1 | 9/2014 | White et al. | |
| 2014/0282002 A1 | 9/2014 | McKiel, Jr. | |
| 2015/0082162 A1 | 3/2015 | Cho | |
| 2015/0302774 A1 | 10/2015 | Dagar | |
| 2016/0011720 A1 | 1/2016 | Walther | |
| 2016/0203625 A1 | 7/2016 | Khan et al. | |
| 2016/0252960 A1 | 9/2016 | Kim | |
| 2017/0090751 A1 | 3/2017 | Paek et al. | |
| 2017/0097807 A1 | 4/2017 | Park et al. | |
| 2018/0121796 A1 | 5/2018 | Deisher et al. | |
| 2018/0211503 A1 | 7/2018 | Baliga et al. | |
| 2018/0246622 A1 | 8/2018 | Lee et al. | |
| 2020/0064998 A1 | 2/2020 | Paek et al. | |
| 2021/0117003 A1 | 4/2021 | Deisher et al. | |
| 2021/0117152 A1 | 4/2021 | Deisher et al. | |
| 2021/0193110 A1* | 6/2021 | Park | G10L 13/10 |
| 2023/0113950 A1* | 4/2023 | Shih | G10L 13/08 704/260 |
| 2023/0134984 A1 | 5/2023 | Chen | |

OTHER PUBLICATIONS

International Searching Authority, "Written Opinion of the International Searching Authority," issued in connection with International Patent Application No. PCT/US2021/051100, mailed on Dec. 28, 2021, 6 pages.

International Searching Authority, "International Search Report," issued in connection with International Patent Application No. PCT/US2021/051100, mailed on Dec. 28, 2021, 5 pages.

International Searching Authority, "International Search Report," issued in connection with International Patent Application No. PCT/US2021/051097, mailed on Jan. 3, 2022, 4 pages.

International Searching Authority, "Written Opinion of the International Searching Authority," issued in connection with International Patent Application No. PCT/US2021/051097, mailed on Jan. 3, 2022, 5 pages.

International Searching Authority, "International Preliminary Report on Patentability," issued in connection with International Patent Application No. PCT/US2021/051100, mailed on May 4, 2023, 8 pages.

United States Patent and Trademark Office, "Non-Final Office Action," issued in connection with U.S. Appl. No. 17/133,162, dated Nov. 24, 2023, 32 pages.

United States Patent and Trademark Office, "Non-Final Office Action," issued in connection with U.S. Appl. No. 17/133,154, dated Feb. 2, 2024, 17 pages.

United States Patent and Trademark Office, "Final Office Action," issued in connection with U.S. Appl. No. 17/133,162, dated Apr. 18, 2024, 40 pages.

United States Patent and Trademark Office, "Notice of Allowance and Fee(s) Due," issued in connection with U.S. Appl. No. 17/133,154, dated Jul. 19, 2024, 8 pages.

International Searching Authority, "International Preliminary Report on Patentability," issued in connection with International Patent Application No. PCT/US2021/051097, mailed on May 4, 2023, 7 pages.

* cited by examiner

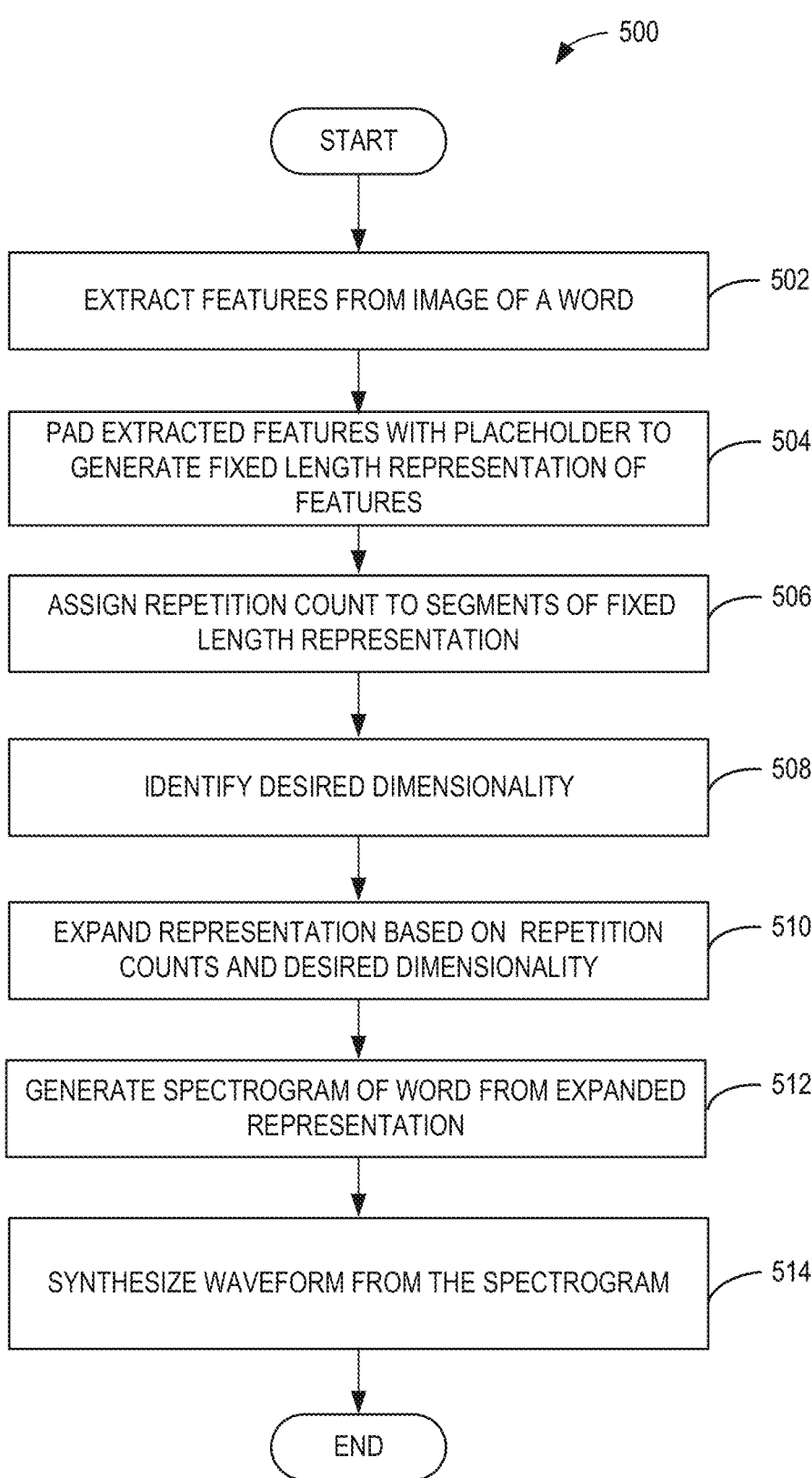

500

START

EXTRACT FEATURES FROM IMAGE OF A WORD — 502

PAD EXTRACTED FEATURES WITH PLACEHOLDER TO GENERATE FIXED LENGTH REPRESENTATION OF FEATURES — 504

ASSIGN REPETITION COUNT TO SEGMENTS OF FIXED LENGTH REPRESENTATION — 506

IDENTIFY DESIRED DIMENSIONALITY — 508

EXPAND REPRESENTATION BASED ON REPETITION COUNTS AND DESIRED DIMENSIONALITY — 510

GENERATE SPECTROGRAM OF WORD FROM EXPANDED REPRESENTATION — 512

SYNTHESIZE WAVEFORM FROM THE SPECTROGRAM — 514

END

START

TRAIN IMAGE ENCODER CIRCUITRY USING CROSS ENTROPY LOSS — 602

FREEZE ENCODER CIRCUITRY WEIGHTS — 604

TRAIN DECODER CIRCUITRY WITH L1 LOSS AND STRUCTURAL SIMILARITY LOSS — 606

TRAIN DURATION DETERMINATION CIRCUITRY USING MEAN SQUARE ERROR — 608

ADJUST PARAMETERS FOR FINE TUNING — 610

END

METHODS AND APPARATUS TO CONVERT IMAGE TO AUDIO

RELATED APPLICATION

This patent claims the benefit of U.S. Provisional Patent Application No. 63/417,224, which was filed on Oct. 18, 2022. U.S. Provisional Patent Application No. 63/417,224 is hereby incorporated herein by reference in its entirety. Priority to U.S. Provisional Patent Application No. 63/417,224 is hereby claimed.

FIELD OF THE DISCLOSURE

This disclosure relates generally to neural networks and, more particularly, to methods and apparatus to convert image to audio.

BACKGROUND

In machine learning, a convolutional neural network is a type of feed-forward artificial network which captures spatial and temporal dependencies in images through the application of filters. Convolutional neural networks (CNNs) are widely used throughout computer vision to allow computer systems to derive a high-level understanding of images. Common CNN tasks include image classification and detection of text in an image

BRIEF DESCRIPTION OF THE DRAWINGS

FIG. 5 is a flowchart representative of example machine readable instructions and/or example operations that may be executed by example processor circuitry to implement the transducer circuitry of FIG. 3.

Figure 1:
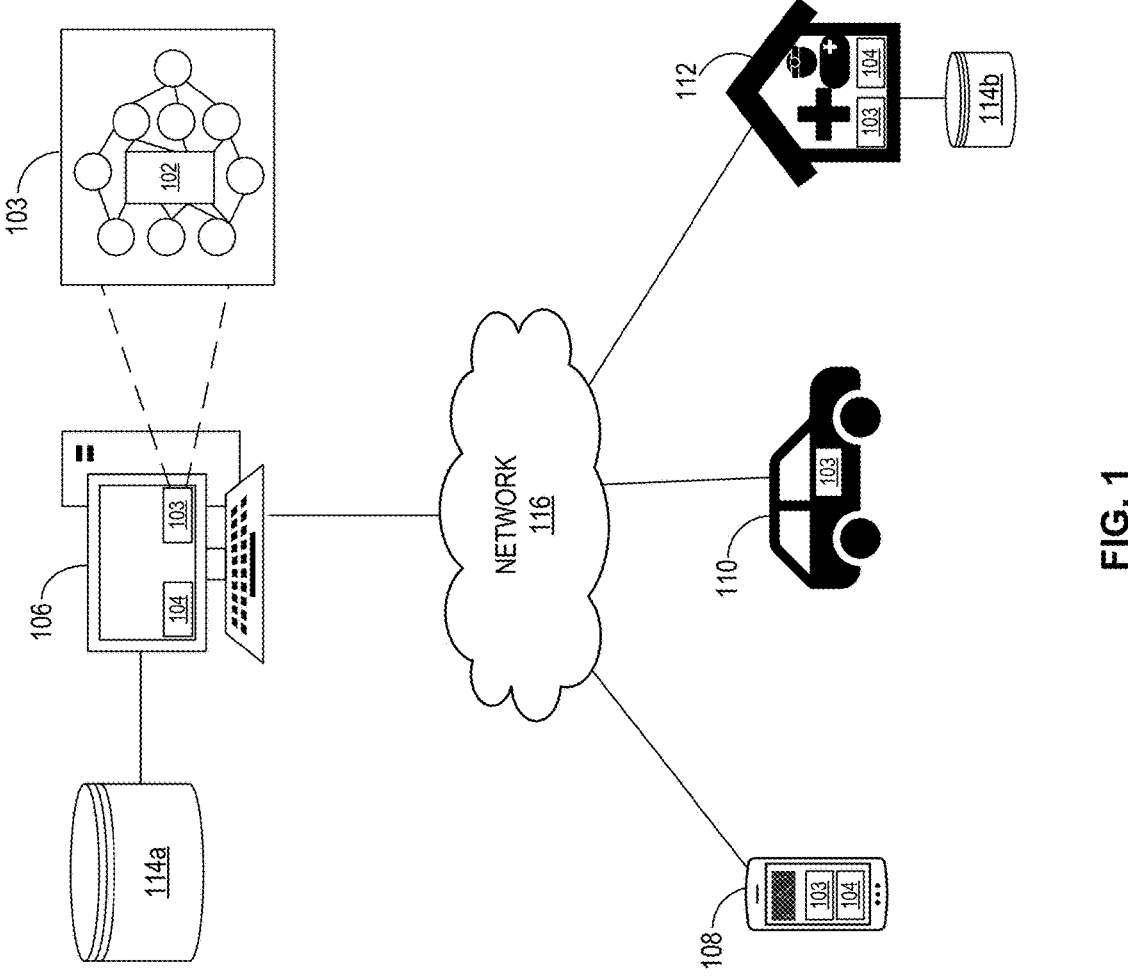
FIG. 1 is an illustration of example environments in which transducer circuitry operates to convert an image to audio.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

An image-to-text (ITT) model is a ML model that takes an image as input and recognizes text in the image. Generally, an ITT contains three modules: a rectifier, an image encoder, and a sequential decoder. The rectifier segments and normalizes images through transformation of the text into a normalized form. The image encoder extracts hidden representations from the normalized image, and the decoder generates a sequence of characters based on the hidden representations.

A text-to-speech (TTS) model takes text input and synthesizes the input into natural, human-intelligible speech. To do this, the TTS model first converts text, as a sequence of phonemes (e.g., any one of the perceptually distinct units of sound in a given language), to acoustic features. The acoustic features may be a sequence of mel-spectra in a mel-spectrogram. A mel-spectrogram is a spectrogram in which the frequencies that make up the sound in the spectrogram are converted to the mel scale (e.g., a scale in which equal distances in pitch sound equally distant to the listener). The TTS model then transforms the acoustic features into audio samples (e.g., through a vocoder).

Conventional solutions for converting image to speech (ITS) naively combine ITT models and TTS models to generate an ITS model. In other words, conventional solutions convert pixels to text using a first ML model, and then convert text to speech using a second ML model. However, naively combining ITT models with TTS models has multiple drawbacks. Such systems are large and computationally expensive to train, as the pipeline has many steps. Additionally, some portions of such systems are not neural network-based, so programmers must manually program these portions, increasing development costs. Problems arising at the interface between the ITT and the TTS models are especially common, such as when a conventional ITT model has a different output sequence length than the TTS model.

Technical solutions described herein present a system to transform text in an image to audio with a single ML model. By generating a single ITS model, the aforementioned drawbacks of multi-model systems can be avoided. Examples disclosed herein require less manual programming and operate more efficiently than conventional ITS solutions by presenting a complete, end-to-end, ITS model.

Disclosed examples may be especially useful when executing ITS tasks on neural network co-processors. A neural network accelerator is a processor that is optimized specifically to handle neural network workloads. Examples disclosed herein can be simply and efficiently implemented on neural network accelerators. Therefore, examples disclosed herein are efficient, with a reduced cost per watt and lesser power consumption when compared to prior solutions.

Disclosed examples include features such as padding intermediate outputs to generate a consistent length intermediate output. Disclosed examples additionally include duration predicator circuitry that can predict phoneme duration and associate a placeholder with a desired (e.g., zero) duration.

Disclosed examples present a non-autoregressive end-to-end image-to-audio neural network architecture that simplifies hardware design and the ITS inference process, while at the same time reducing memory requirements. Disclosed examples therefore present a non-autoregressive end-to-end neural network suitable for embedded hardware implementation of an image-to-audio subsystem in personal computing devices. Some examples may be used in an end-to-end image-to-audio neural network that generates audible representations of sub-screen snapshots near a finger or touch pointer.

Turning to the figures, FIG. 1 is a schematic illustration of an example environment 100 in which transducer circuitry 102 operates to convert text to audio. The example environment 100 includes the example transducer circuitry 102, example image-to-audio neural network circuitry 103, example training circuitry 104, example first training data 114*a*, example second training data 114*b*, an example server

106, an example mobile device 108, an example vehicle 110, an example hospital 112, and an example network 116.

Users of computing devices such as cell phones, tablets, connected appliances, internet-of-things, and laptops may encounter situations where safety considerations or visual impairment make it difficult to take in display content. The environment 100 illustrates scenarios in which users of computing devices encounter such challenges. The transducer circuitry 102 (e.g., and any other elements of the image-to-audio neural network circuitry 103) can improve distracted and/or visually impaired (e.g., low vision) user's interaction with computing devices in such scenarios.

For example, a user may be unable to safely view a screen of the mobile device 108 while crossing a busy street. A driver of the vehicle 110 may unable to visually interact with an entertainment system of the vehicle 110 while driving. A surgeon in the hospital 112 may be unable to interrupt a surgical procedure to access life-saving surgical data. In all these example scenarios, and many more, the transducer circuitry 102 can improve user outcomes by converting one or more images to audio with an end-to-end non-autoregressive neural network.

The transducer circuitry 102 is applicable to a wide variety of environments beyond those illustrated in FIG. 1. For example, the transducer circuitry 102 also provides improved image-to-audio conversion performance in compute devices that have limited memory and/or compute capabilities, such as embedded platforms. Therefore, the transducer circuitry may be particularly useful in performing image-to-audio conversion on compute-constrained embedded platforms (e.g., internet of things devices, smart home devices, etc.). Computing devices are essential to modern-day life, and the transducer circuitry 102 may improve human-computer interaction in any situation in which a user wishes to interact with visual elements of the computing device. Furthermore, the transducer circuitry 102 helps bridge the gap between sighted and visually impaired users by making image-to-audio conversion available on a wider variety of devices and in a wider variety of scenarios.

In FIG. 1, the transducer circuitry 102 included as part of the example image-to-audio neural network circuitry 103. The example image-to-audio neural network circuitry 103 is a neural network that converts images to audio. The transducer circuitry 102 and/or the example image-to-audio neural network circuitry 103 may be trained by the training circuitry 104 on training data (e.g., such as the first training data 114*a* and the second training data 114*b*). Training of each respective instance of the transducer circuitry 102 and/or, more generally, the image-to-audio neural network circuitry 103, may be performed on-device (e.g., at the mobile device 108) and/or off-device. For example, the example image-to-audio neural network circuitry 103 may be trained on a first device (e.g., the server 106) and transmitted to one or more entities such as the mobile device 108, the vehicle 110, and/or the hospital 112. In some examples, parameters (e.g., parameters of a neural network model) for updating the transducer circuitry 102 and/or the example image-to-audio neural network circuitry 103 may be transmitted between the server 106 and any device connected to the network 116. In other examples, training of the transducer circuitry 102 and/or the example image-to-audio neural network circuitry 103 may be performed completely on a single device without communication to any other device. The training circuitry 104 will be discussed further in association with FIGS. 3, 4, and 6.

In the example of FIG. 1, a separate instance of the example image-to-audio neural network circuitry 103 (e.g., and the included transducer circuitry 102) is included in each of the mobile device 108, the vehicle 110, the hospital 112, and the server 106. However, in some examples the transducer circuitry 102 may not be included in one or more of the server 106, the mobile device 108, the vehicle 110, and/or the hospital 112. The structure and function of the transducer circuitry 102 will be described in association with FIGS. 3-5.

Figures 2A, 2B:
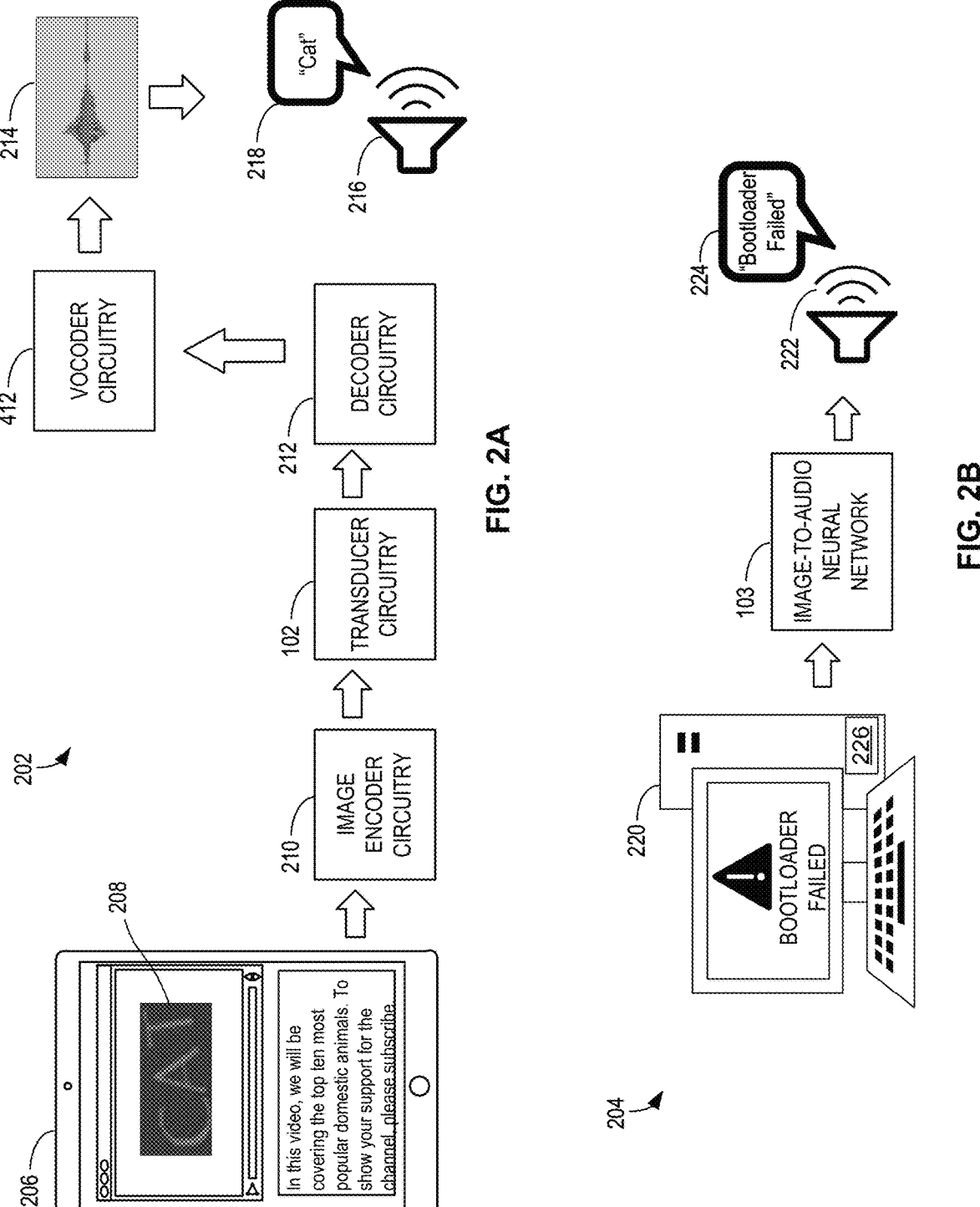
FIG. 2A is an illustration of a conversion of text to audio with the transducer circuitry of FIG. 1.
FIG. 2B is an illustration of conversion of text to audio with the image-to-audio neural network of FIG. 1.

FIG. 2A is a first illustration 202 of a conversion of text to audio with the transducer circuitry 102 of FIG. 1. The first illustration 202 includes a tablet computer 206 that displays an image 208. The image 208 is an image of the word "CAT". Traditional screen readers cannot identify and describe the word "CAT" embedded in the image 208 unless metadata such as alt text is present. However, with the transducer circuitry 102, the word "CAT" embedded in the image 208 can be transformed to audio, providing an accurate description of the image 208.

To identify "CAT" in the image 208 and convert the word within the image 208 into an audio playback 218 of "CAT," the image is first encoded by image encoder circuitry 210. The image encoder circuitry 210 extracts fixed-length hidden features from the image 208 (e.g., the word, "CAT"). The transducer circuitry 102 then expands the features into the length of the word's (e.g., "CAT's") Mel-spectrogram. The decoder circuitry 212 (e.g., a variational autoencoder (VAE), any other decoder, etc.) synthesizes the mel-spectrogram based on the expanded features. The waveform 214 of the word "CAT" is then provided to a first speaker 216, which plays the audio, completing the image-to-audio conversion. A more detailed example of the image-to-audio conversion of the first illustration will be provided in association with FIG. 4.

FIG. 2B is an example second illustration 204 of conversion of image text to audio with the image-to-audio neural network circuitry 103 of FIG. 1. The second illustration 204 includes a personal computer 220, the transducer circuitry 102, the image-to-audio neural network circuitry 103, a second speaker 222, and speech 224. The personal computer 220 includes neural-network coprocessor circuitry 226 that includes an instance of the image-to-audio neural network circuitry 103 (e.g., and therefore the transducer circuitry 102). In the second illustration 204, an operating system (OS) of the personal computer 220 has failed to fully load.

Typical screen readers are subordinate to the OS and may not render text content within images when the OS of the personal computer 220 fails to load. However, in FIG. 2B, the image-to-audio neural network circuitry 103 of FIG. 2B is implemented on a dedicated neural network co-processor circuitry 226, providing operating system independence. Thus, the image-to-audio neural network circuitry 103 that is included FIG. 2B can implement end-to-end image-to-speech conversion independent of OS and/or application failure.

In contrast to FIG. 2A, the encoder circuitry 210, the transducer circuitry 102, and the decoder circuitry 212 of FIG. 2B are all included in the image-to-audio neural network circuitry 103. Thus, in some examples, the image-to-audio neural network circuitry 103 performs all operations included in an end-to-end conversion of an image to audio, including the operations carried out by the transducer circuitry 102.

Figure 3:
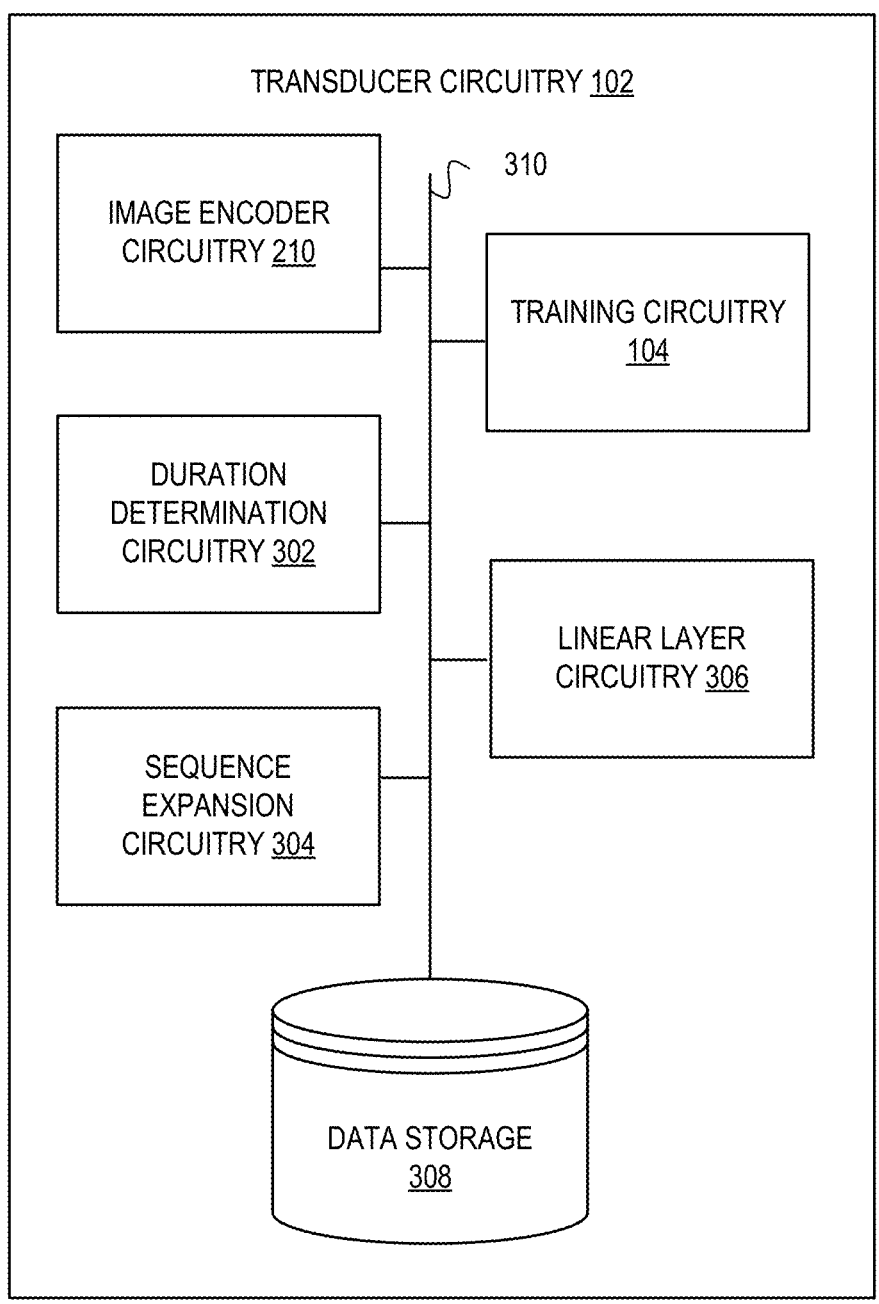
FIG. 3 is a block diagram of an example implementation of the transducer circuitry of FIG. 1 to convert text to audio.

FIG. 3 is a block diagram of an example implementation of the transducer circuitry 102 of FIG. 1 to convert text to audio. The transducer circuitry 102 bridges the gap between image encoder circuitry 210 of FIG. 2A and the decoder circuitry 212 of FIG. 2A. The transducer circuitry 102 enables end-to-end training of a non-autoregressive ITS system with limited constraints on the loss function for the image encoder circuitry 210. The transducer circuitry 102 of FIG. 2 may be instantiated (e.g., creating an instance of, bring into being for any length of time, materialize, implement, etc.) by processor circuitry such as a central processing unit executing instructions. Additionally or alternatively, the transducer circuitry 102 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The example transducer circuitry 102 includes example image encoder circuitry 210. In some examples, the image encoder circuitry 210 accesses an image that includes a word. The example image encoder circuitry 210 extracts an ordered list of phonemes of the word. As a result, the image encoder circuitry 210 extracts hidden features (e.g., phonemes) and syntactic information from an example image, generating a fixed-length output. The fixed-length output is generated despite an input word having any number of input phonemes. The image encoder circuitry 210 may pad the phonemes extracted from the word using a placeholder symbol to generate the fixed representation.

In some examples the image encoder circuitry 210 is a separate image encoder (e.g., not included in the transducer circuitry 102) that provides data to the transducer circuitry 102. In some examples, the image encoder circuitry 210 is instantiated by processor circuitry executing image encoding instructions and/or configured to perform operations such as those represented by the flowcharts of FIGS. 5-6.

In some examples, the transducer circuitry 102 includes means for providing an image that includes a word to an image encoder that extracts an ordered list of phonemes of the word. For example, the means for providing may be implemented by image encoder circuitry 210. In some examples, the image encoder circuitry 210 may be instantiated by processor circuitry such as the example processor circuitry 712 of FIG. 7. For instance, the image encoder circuitry 210 may be instantiated by the example microprocessor 800 of FIG. 8 executing machine executable instructions such as those implemented by at least blocks 502 and 504 of FIG. 5. In some examples, the image encoder circuitry 210 may be instantiated by hardware logic circuitry, which may be implemented by an ASIC, XPU, or the FPGA circuitry 900 of FIG. 9 structured to perform operations corresponding to the machine readable instructions. Additionally or alternatively, the image encoder circuitry 210 may be instantiated by any other combination of hardware, software, and/or firmware. For example, the image encoder circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example transducer circuitry 102 includes the example duration determination circuitry 302. The duration determination circuitry 302 assigns a duration value to a phoneme of the fixed-length representation. As will be described in association with the illustrated example of FIG. 4, the duration value corresponds to a length of time the phoneme is expressed in an audio waveform of a word. The duration determination circuitry 302 identifies which phonemes should be actively synthesized in the audio and identifies placeholder symbols that will not be synthesized in the output audio. The duration determination circuitry 302 associates a duration value with one or more phonemes in a fixed-length representation. In some examples, a special padding symbol (e.g., the placeholder symbol "_" of FIG. 4) is assigned a zero value, and that value does not appear in an expanded representation.

In some examples, the duration determination circuitry 302 is instantiated by processor circuitry executing duration determining instructions and/or configured to perform operations such as those represented by the flowchart of FIG. 5.

In some examples, the transducer circuitry 102 includes means for assigning a duration value to a phoneme of the fixed-length representation. For example, the means for assigning may be implemented by duration determination circuitry 302. In some examples, the duration determination circuitry 302 may be instantiated by processor circuitry such as the example processor circuitry 712 of FIG. 7. For instance, the duration determination circuitry 302 may be instantiated by the example microprocessor 800 of FIG. 8 executing machine executable instructions such as those implemented by at least blocks 506 of FIG. 5. In some examples, duration determination circuitry 302 may be instantiated by hardware logic circuitry, which may be implemented by an ASIC, XPU, or the FPGA circuitry 900 of FIG. 9 structured to perform operations corresponding to the machine readable instructions. Additionally or alternatively, the duration determination circuitry 302 may be instantiated by any other combination of hardware, software, and/or firmware. For example, the duration determination circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example transducer circuitry 102 includes the example sequence expansion circuitry 304. The example sequence expansion circuitry 304 generates an expanded representation of a fixed-length representation based on the duration value and a desired dimensionality. The example sequence expansion circuitry 304 generates an expanded representation of the fixed-length representation based on the duration values provided by the example duration determination circuitry 302 and a desired dimensionality that is provided by the linear layer circuitry 306.

In some examples, sequence expansion circuitry 304 is instantiated by processor circuitry executing image encoding instructions and/or configured to perform operations such as those represented by the flowchart of FIG. 5.

In some examples, the sequence expansion circuitry 304 includes means for generating an expanded representation of the fixed-length representation. For example, the means for generating may be implemented by sequence expansion circuitry 304. In some examples, the sequence expansion circuitry 304 may be instantiated by processor circuitry such as the example processor circuitry 712 of FIG. 7. For instance, the sequence expansion circuitry 304 may be instantiated by the example microprocessor 800 of FIG. 8 executing machine executable instructions such as those implemented by at least block 510 of FIG. 5. In some examples, the sequence expansion circuitry 304 may be instantiated by hardware logic circuitry, which may be implemented by an ASIC, XPU, or the FPGA circuitry 900 of FIG. 9 structured to perform operations corresponding to the machine readable instructions. Additionally or alternatively, the sequence expansion circuitry 304 may be instantiated by any other combination of hardware, software, and/or firmware. For example, the sequence expansion circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware.

The example transducer circuitry 102 includes example training circuitry 104. The example training circuitry 104 may train any of the example linear layer circuitry 306, the image encoder circuitry 210, the duration determination circuitry 302, the example decoder circuitry 212, and/or the example vocoder circuitry 412 using, for example, stochastic gradient descent. However, any other training algorithm and/or approach to training may additionally or alternatively be used. In some examples, the training circuitry 104 is instantiated by processor circuitry executing image encoding instructions and/or configured to perform operations such as those represented by the flowchart of FIG. 6.

In some examples, the transducer circuitry 102 includes means for training a neural network. For example, the means for training may be implemented by the training circuitry 104. In some examples, the training circuitry 104 may be instantiated by processor circuitry such as the example processor circuitry 712 of FIG. 7. For instance, the training circuitry 104 may be instantiated by the example microprocessor 800 of FIG. 8 executing machine executable instructions such as those implemented by at least any of the blocks 602 to 610 of FIG. 6. In some examples, the training circuitry 104 may be instantiated by hardware logic circuitry, which may be implemented by an ASIC, XPU, or the FPGA circuitry 900 of FIG. 9 structured to perform operations corresponding to the machine readable instructions. Additionally or alternatively, the training circuitry 104 may be instantiated by any other combination of hardware, software, and/or firmware. For example, the training circuitry 104 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware.

The example transducer circuitry 102 includes the linear layer circuitry 306. The example linear layer circuitry 306 is a bottleneck layer that removes dimensionality mismatches between the image encoder circuitry 210 and the decoder circuitry 212 of FIG. 2A. The linear layer circuitry 306 thereby enhances the flexibility of the transducer circuitry 102, so that various image encoders and various decoders (e.g., mel-spectrogram generators) are interoperable with the transducer circuitry 102. The example linear layer circuitry 306 (e.g., fully connected layer, dense layer, etc.) transforms input features into output features of a different dimensionality using a weight matrix. In some examples, input features received by the linear layer circuitry 306 are passed in the form of a flattened one-dimension tensor and then multiplied by the weight matrix. In some examples, linear layer circuitry 306 is instantiated by processor circuitry executing image encoding instructions and/or configured to perform operations such as those represented by the flowchart of FIG. 5.

In some examples, the linear layer circuitry 306 includes means for transforming a dimensionality of a tensor in a neural network. For example, the means for transforming may be implemented by linear layer circuitry 306. In some examples, the linear layer circuitry 306 may be instantiated by processor circuitry such as the example processor circuitry 712 of FIG. 7. For instance, linear layer circuitry 306 may be instantiated by the example microprocessor 800 of FIG. 8 executing machine executable instructions such as those implemented by at least block 508 of FIG. 5. In some examples, the linear layer circuitry 306 may be instantiated by hardware logic circuitry, which may be implemented by an ASIC, XPU, or the FPGA circuitry 900 of FIG. 9 structured to perform operations corresponding to the machine readable instructions. Additionally or alternatively, the linear layer circuitry 306 may be instantiated by any other combination of hardware, software, and/or firmware. For example, the linear layer circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware.

The example transducer circuitry additionally includes an example bus 310 and example data storage circuitry 308. The example bus 310 may provide interconnections between any of the example image encoder circuitry 210, the example duration determination circuitry 302, the example sequence expansion circuitry 304, the example training circuitry 104, and/or the example linear layer circuitry 306. The example data storage 308 may include means for storing training data for and/or input/output of any of the example image encoder circuitry 210, the example duration determination circuitry 302, the example sequence expansion circuitry 304, the example training circuitry 104, and/or the example linear layer circuitry 306. The example data storage circuitry 308 may store training data for use by the training circuitry 104, for example.

While an example manner of implementing the transducer circuitry 102 of FIG. 1 is illustrated in FIG. 3, one or more of the elements, processes, and/or devices illustrated in FIG. 3 may be combined, divided, re-arranged, omitted, eliminated, and/or implemented in any other way. Further, the example image encoder circuitry 210, the example duration determination circuitry 302, the example sequence expansion circuitry 304, the example training circuitry 104, and the example linear layer circuitry 306, and/or more generally the example transducer circuitry 102 of FIG. 1 may be implemented by hardware alone or by hardware in combination with software and/or firmware. Thus, for example, any of the example the example image encoder circuitry 210, the example duration determination circuitry 302, the example sequence expansion circuitry 304, the example training circuitry 104, and the example linear layer circuitry 306, and/or more generally the example transducer circuitry 102 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example transducer circuitry 102 of FIG. 1 may include one or more elements, processes, and/or devices in addition to, or instead of, those illustrated in FIG. 3, and/or may include more than one of any or all of the illustrated elements, processes and devices.

Figure 4:
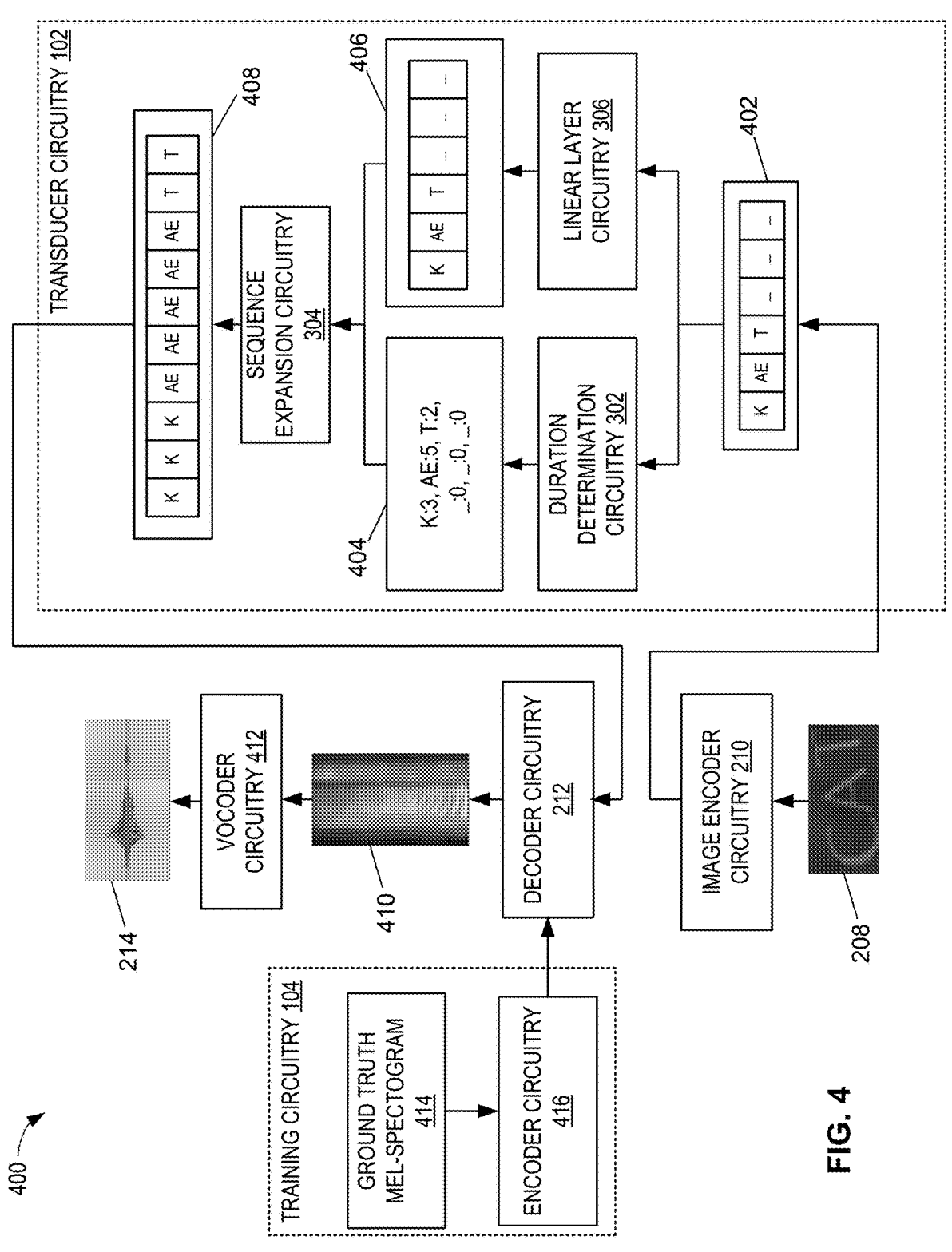
FIG. 4 is an illustration of an example end-to-end image-to-audio system including the transducer circuitry of FIG. 1 and the training circuitry 104 of FIG. 1.

FIG. 4 is an illustration of an example system 400 for end-to-end image-to-speech conversion. The system 400 includes an image 208, image encoder circuitry 210, transducer circuitry 102, the decoder circuitry 212 (e.g., VAE decoder circuitry), a mel-spectrogram 410, vocoder circuitry 412, the waveform 214, and the training circuitry 104.

The example transducer circuitry 102 includes a fixed width representation 402, duration determination circuitry 302, linear layer circuitry 306, duration values 404, a transformed representation 406, sequence expansion circuitry 304, and an expanded representation 408. The example training circuitry 104 includes a ground truth mel-spectrogram 414 and encoder circuitry 416.

The pipeline of the system 400 for end-to-end image-to-speech conversion begins with image 208. The image 208 includes a series of pixels that include the word "CAT." Although the input image only includes the single word "CAT", the input image may be any image that includes one or more words, one or more series of characters, one or more symbols, etc.

The image 208 is provided to the example image encoder circuitry 210. The image encoder circuitry 210 extracts hidden features (e.g., phonemes) and syntactic information from the example image 208. In this case, the image encoder circuitry 210 extracts the phonemes "K", "AE", and "T" from the image 208. In some examples, the image encoder circuitry 210 includes a pooling layer that extracts global semantic information from hidden features and feeds the global semantic information to a quantity (e.g., 26) of linear layers, wherein each linear layer predicts the one respective output (e.g., i-th linear layer predicts i-th output).

The example image encoder circuitry 210 generates a fixed-length output, regardless of any number of input phonemes associated with the word. To produce a fixed-length output, the example image encoder circuitry 210 may insert one or more placeholder characters at the end of the fixed-length representation. For example, if a fixed-length representation of 26 layers is desired, and a word has N phonemes, the last 26-N layers can be filled with the placeholder character (e.g., "_").

The image encoder circuitry 210 produces the fixed-length representation 402 as an output. The fixed-length representation 402 is an ordered list of phonemes including "K", "AE", and "T". In the example system 400 of FIG. 4, the fixed-length representation is six characters. However, the input image 208 includes the word "CAT" that has three phonemes. Therefore, to generate the fixed representation of six characters, the image encoder circuitry 210 has padded the ordered list of phonemes of the fixed-length representation 402 with three placeholder characters (e.g., "_"). It is through padding that the example image encoder circuitry 210 generates a fixed-length representation for any word identified in the input image 208. Such consistency provides a simplified and consistent flow through the system 400 (e.g., the neural network) regardless of how many phonemes are in the original word identified in the image.

The example fixed-length representation 402 is provided to the example duration determination circuitry 302 and to the example linear layer circuitry 306. The duration determination circuitry 302 determines how many times each feature (e.g., each phoneme) should be repeated. The duration determination circuitry 302 identifies which frame (e.g., a frame as one phoneme, one character, one symbol, etc.) should be actively synthesized in the audio and which frames are placeholder symbols that will not be synthesized in the audio. For example, in FIG. 4, the duration determination circuitry 302 is trained to recognize that "_" should have a zero duration. The duration determination circuitry 302 will identify phonemes that will be expressed (in an audio waveform of the word) with a positive value, while placeholder symbols will be zero.

The duration determination circuitry 302 may be trained in a supervised manner with a forced aligner. The forced aligner may take a ground truth audio and a corresponding phoneme sequence and align the audio and the ground truth audio. In some examples, the duration determination circuitry 302 includes two convolutional blocks, wherein each block of the two convolutional blocks includes: a) a 1D time-channel separable convolution, b) a 1×1 step-wise convolution, c) a normalization layer, d) a ReLU layer, and e) a dropout layer. For example, a linear layer along with a softplus layer may project a sequence of hidden feature representations (e.g., phonemes of word identified in an image) to a sequence of scalars. The sequence of scalars corresponds to predicted phoneme durations.

The example fixed-length representation 402 is also provided to the example linear layer circuitry 306. The example linear layer circuitry 306 is a bottleneck layer that addresses (e.g., corrects) any dimensionality mismatch between the linear layer circuitry 306 and the decoder circuitry 212. The linear layer circuitry 306 enhances the flexibility of the transducer circuitry 102 so that various image encoders and various decoders (e.g., mel-spectrogram generators) in the field are compatible with the transducer circuitry 102. For example, some image encoders may generate output in 512 dimensions, while a corresponding decoder requires a 128 dimension input. To handle this dimensionality mismatch, the linear layer circuitry 306 performs a dimensionality transformation (e.g., thereby serving as a bottleneck).

The example duration values 404 represent a duration that each phoneme (e.g., frame, element of the fixed-length representation 402, etc.) is expressed (e.g., in an audio waveform of the word). In the example of FIG. 1, "K" is associated with the value "3", "AE" is associated with the value "5", and "T" is associated with the value "2". Therefore, the feature "K" will be duplicated three times by the sequence expansion circuitry 304, the feature "AE" will be duplicated five times by the sequence expansion circuitry 304, and the feature "T" will be duplicated two times by the sequence expansion circuitry 304. The placeholder symbols "_" are all associated with zero, and therefore will not be included in the expanded representation 408.

The example sequence expansion circuitry 304 may generate an expanded representation of the fixed-length representation based on the duration values provided by the example duration determination circuitry 302 and a desired dimensionality that is provided by the linear layer circuitry

306. In some examples, the sequence expansion circuitry 304 is a software package that takes a predicted duration and the transformed representation and generates the expanded representation 408 by repeating phonemes a number of times that corresponds to a duration value produced by the duration determination circuitry 302. The expanded representation 408 illustrates that the phoneme "K" has been repeated three times, the phoneme "AE" has been repeated five times, and the phoneme "T" has been repeated twice. The "_" placeholders (e.g., placeholder symbols) have also been removed from the expanded representation 408, as the duration for each "_" symbol was determined to be zero by the duration determination circuitry 302. Furthermore, the dimensionality of the expanded representation 408 has been transformed based on the output of the linear layer circuitry 306.

The output of the transducer circuitry 102 is provided to the decoder circuitry 212. The decoder circuitry 212 synthesizes the mel-spectrogram 410 based on the expanded representation 408. The example decoder circuitry 212 may be trained by the training circuitry 104. The training circuitry 104 is not, however, required for operation of the example system 400 (e.g., when the system has already been trained). The example training circuitry includes a ground truth mel-spectrogram 414 and encoder circuitry 416 (e.g., a VAE encoder). The example ground truth mel-spectrogram 414 can be used to facilitate supervised training of the system 400. The example encoder circuitry 416 may include a 1D-convolutional layer that is followed by a ReLU activation layer, a normalization layer, and/or a non-causal deep generative model for raw audio waveforms. Any of the example linear layer circuitry 306, the example transducer circuitry 102, the example decoder circuitry 212, and/or the example vocoder circuitry 412 may be trained based on stochastic gradient descent, for example. The example decoder circuitry 212 generates the mel-spectrogram 410, which is provided as input to the vocoder circuitry 412. The vocoder circuitry 412 generates the waveform 214.

Figure 6:
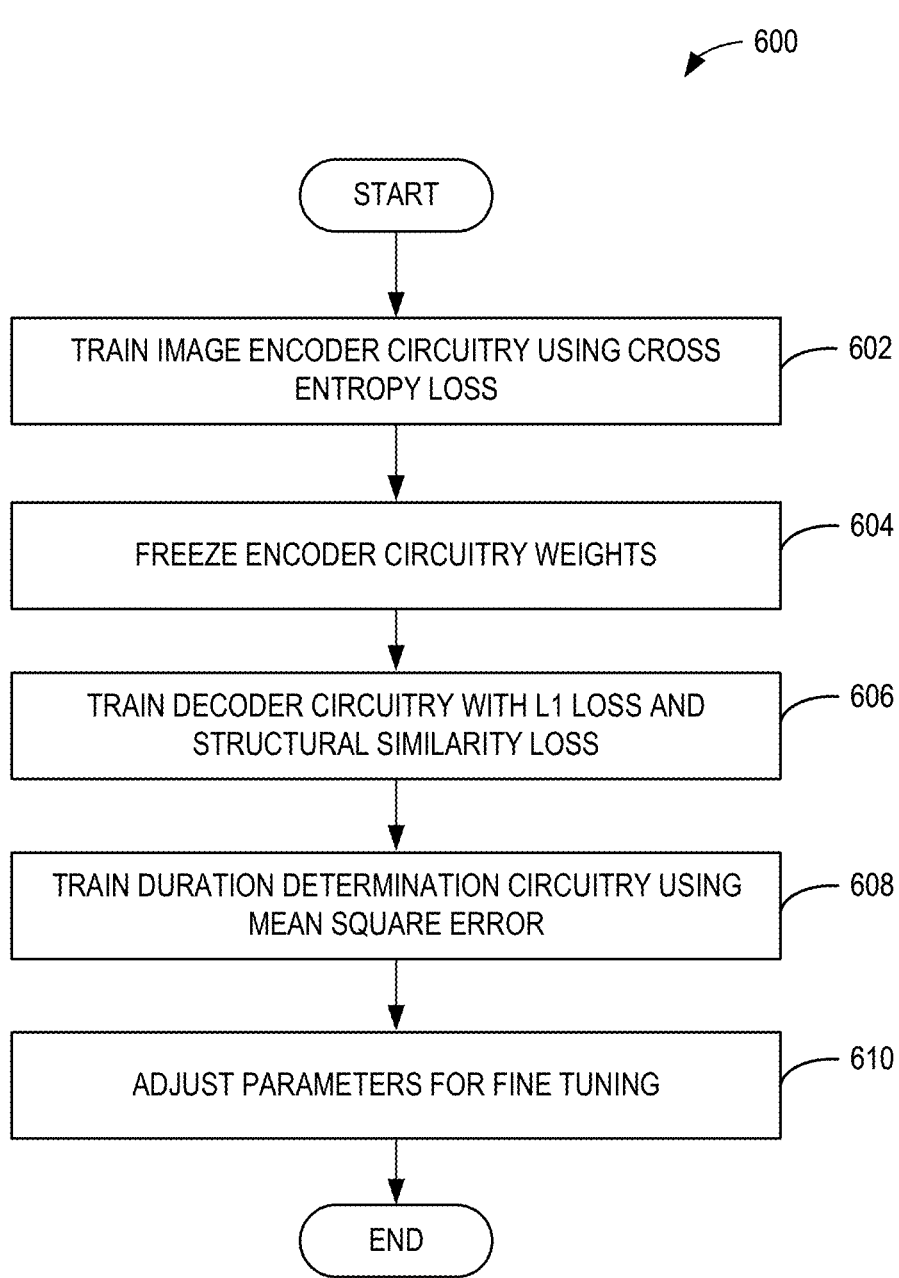
FIG. 6 is a flowchart representative of example machine readable instructions and/or example operations that may be executed by example processor circuitry to implement the training circuitry of FIG. 1.

A flowchart representative of example machine readable instructions, which may be executed to configure processor circuitry to implement the transducer circuitry 102 of FIG. 1, is shown in FIGS. 5-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5-6, many other methods of implementing the example transducer circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 5 is a flowchart representative of example machine readable instructions and/or example operations 500 that may be executed and/or instantiated by processor circuitry convert an image to audio. The machine readable instructions and/or the operations 500 of FIG. 5 begin at block 502, at which the example image encoder circuitry 210 of FIG. 2A extracts features from an image of a word. At block 504, the example image encoder circuitry 210 of FIG. 2A pads extracted features with placeholders to generate a fixed-length representation of the features. At block 506, the example duration determination circuitry 302 of FIG. 3 assigns repetition counts to segments of the fixed-length representation.

At block 508, the example linear layer circuitry 306 of FIG. 3 identifies a desired dimensionality. At block 510, the example sequence expansion circuitry 304 of FIG. 3 expands the representation based on the repetition counts and the desired dimensionality. At block 512, the example decoder circuitry 212 of FIG. 2A generates a spectrogram of word from an expanded representation. At block 514, the example vocoder circuitry 412 of FIG. 1 synthesizes a waveform from the spectrogram.

FIG. 6 is a flowchart representative of example machine readable instructions and/or example operations that may be executed by example processor circuitry to implement the training circuitry 104 of FIG. 1. The example operations 600 of FIG. 6 start at block 602, at which the example training circuitry 104 of FIG. 1 trains an image encoder using cross-entropy loss. For example, the training circuitry 104 of FIG. 1 may measure the performance of a classification model that outputs a probability value (e.g., between 0 and 1).

At block 604, the example training circuitry 104 of FIG. 1 freezes weights of the encoder. As described herein, freezing a weight (e.g., for a layer of a neural network) refers to disabling gradient computation and backpropagation for the weights associated with the layer. At block 606, the example training circuitry 104 of FIG. 1 trains the decoder circuitry 212 of FIG. 2A based on L1 loss and structural similarity loss. At block 608, the example training circuitry 104 of FIG. 1 trains the duration prediction circuitry using mean square error.

Together, the blocks 606 and 608 train an image-to-audio conversion portions of the transducer circuitry 102 of FIG. 1. At block 610, the example training circuitry 104 of FIG. 1 adjusts parameters for fine tuning of the transducer circuitry 102. The operations of block 610 may be omitted in some examples. The instructions end.

Figure 7:
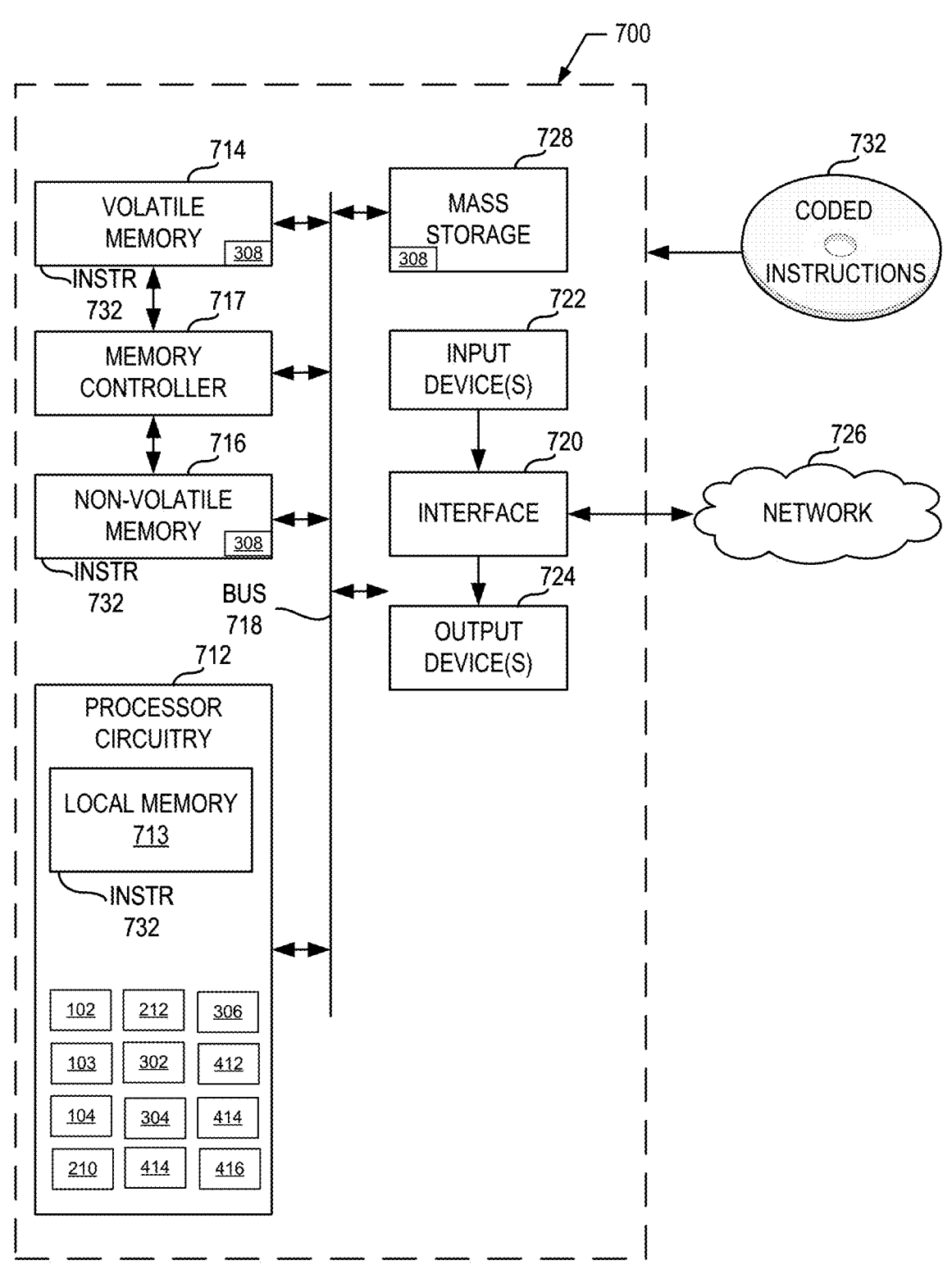
FIG. 7 is a block diagram of an example processing platform including processor circuitry structured to execute the example machine readable instructions and/or the example operations of FIGS. 5 and 6 to implement the transducer circuitry of FIG. 2.

FIG. 7 is a block diagram of an example processor platform 700 structured to execute and/or instantiate the machine readable instructions and/or the operations of FIGS. 5-6 to implement the transducer circuitry 102 of FIG. 1. The processor platform 700 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements, the linear layer circuitry 306, the transducer circuitry 102, the variational autoencoder (VAE) decoder 212, the vocoder circuitry 412, the training circuitry 104, the duration determination circuitry 302, the linear layer circuitry 306, the sequence expansion circuitry 304, and the encoder circuitry 416.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIGS. 5-6 may be stored in the mass storage device 728, in the volatile memory 714, in the non-volatile memory 716, and/or on a removable non-transitory computer readable storage medium such as a CD or DVD.

Figure 8:
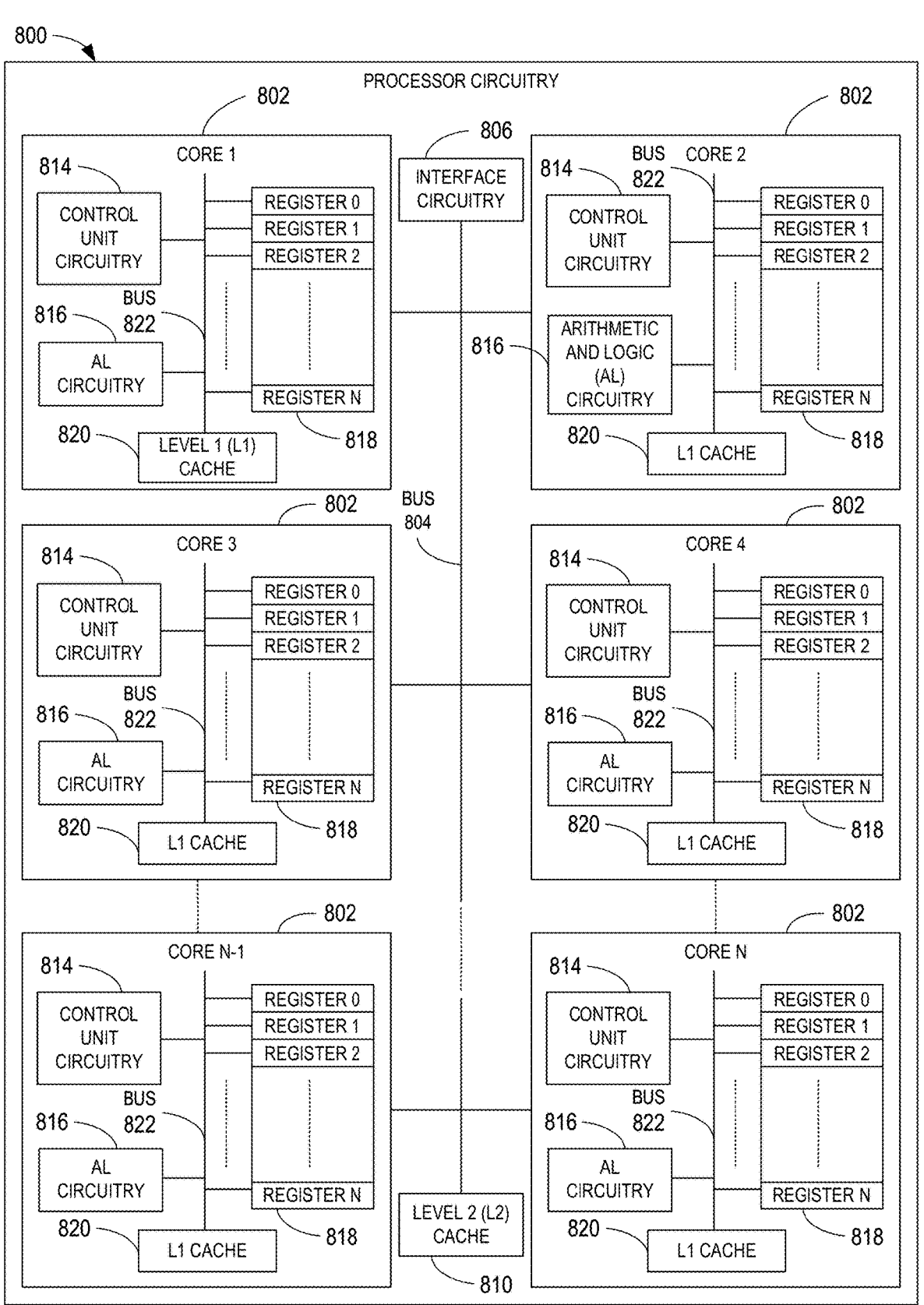
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 5-6 to effectively instantiate the transducer circuitry 102 of FIG. 1 as logic circuits to perform the operations corresponding to those machine readable instructions. In some such examples, the transducer circuitry 102 of FIG. 1 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIGS. 5-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
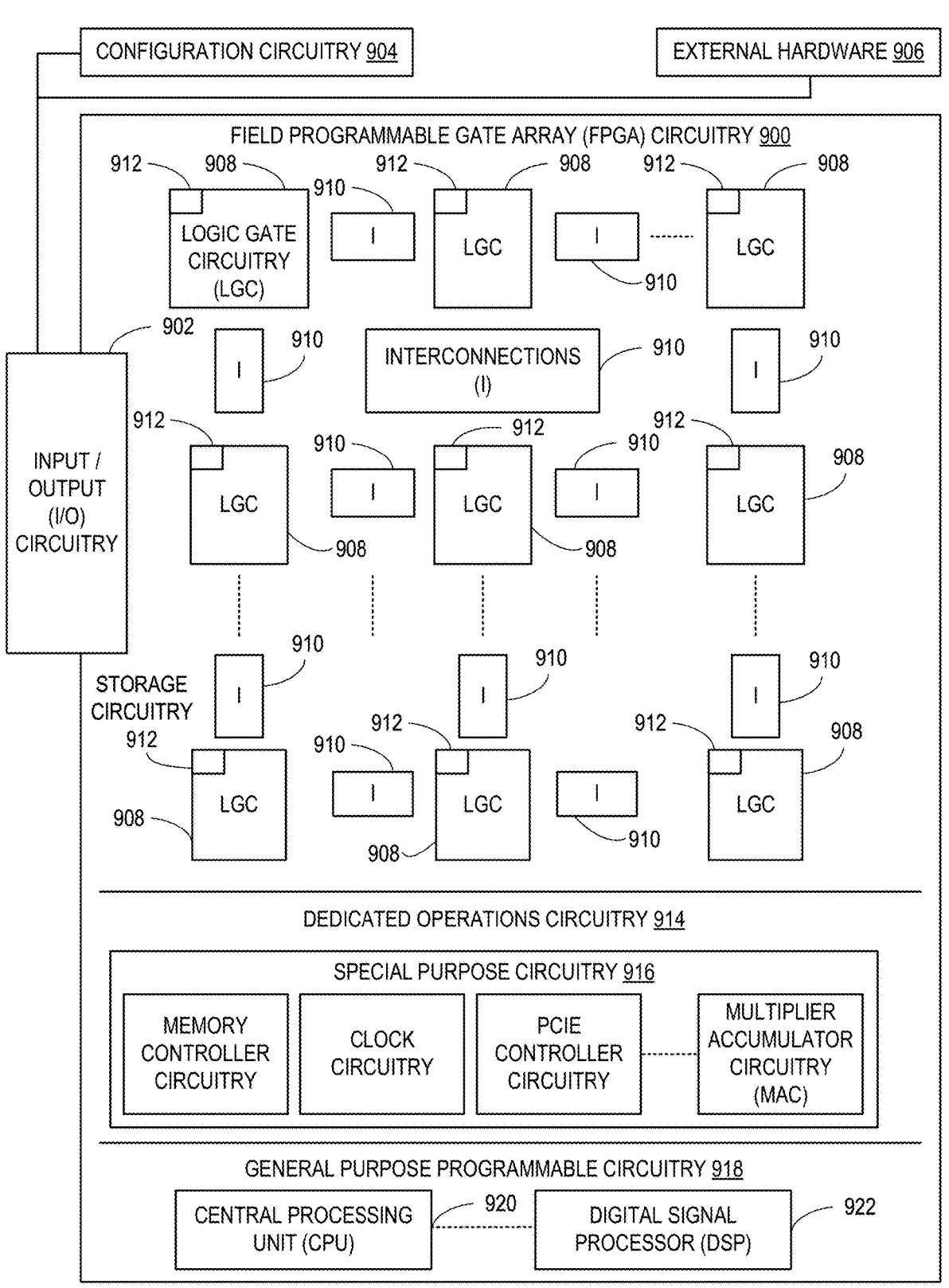
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIGS. 5-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIGS. 5-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5-6. As such, the FPGA circuitry 900 may be structured to effectively instantiate some or all of the machine readable instructions of the flowchart of FIGS. 5-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 5-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 820 of FIG. 8. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 5-6 may be executed by one or more of the cores 802 of FIG. 8, a second portion of the machine readable instructions represented by the flowchart of FIGS. 5-6 may be executed by the FPGA circuitry 900 of FIG. 9, and/or a third portion of the machine readable instructions represented by the flowcharts of FIGS. 5-6 may be executed by an ASIC. It should be understood that some or all of the transducer circuitry 102 of FIG. 1 may, thus, be instantiated at the same or different times. Some or all of the circuitry may be instantiated, for example, in one or more threads executing concurrently and/or in series. Moreover, in some examples, some or all of the transducer circuitry 102 of FIG. 1 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
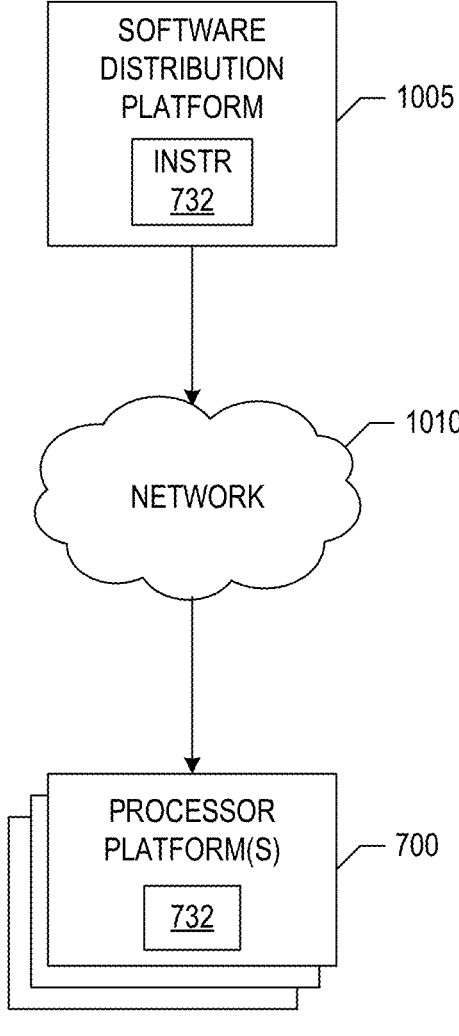
FIG. 10 is a block diagram of an example software distribution platform (e.g., one or more servers) to distribute software (e.g., software corresponding to the example machine readable instructions of FIG. 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 500 of FIG. 5 and 600 of FIG. 6, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 500 of FIG. 5 and 600 of FIG. 6 may be downloaded to the example processor platform 700, which is to execute the machine readable instructions 732 to implement the transducer circuitry 102 of FIG. 1. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that convert image to audio. Disclosed systems, methods, apparatus, and articles of manufacture improve the efficiency of using a computing device by presenting a non-autoregressive end-to-end neural network architecture that simplifies hardware design and the ITS inference process, while reducing the memory footprint of ITS inference. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to convert image to audio are disclosed herein. Further examples and combinations thereof include the following:

Example 1 includes an apparatus comprising at least one memory, instructions, and processor circuitry to execute the instructions to identify a word in an image, the word to be converted to an audio waveform, encode the word identified in the image into an ordered list of phonemes, and synthesize the audio waveform of the word based on an output of a neural network that determines a duration that a phoneme of the ordered list of phonemes is to be expressed in the audio waveform.

Example 2 includes the apparatus of example 1, wherein the duration is a duration value, and the processor circuitry to execute the instructions to pad the ordered list of phonemes with one or more placeholders to generate a fixed-length representation of the word identified in the image, and generate an expanded representation of the fixed-length representation based on the duration value and a dimensionality.

Example 3 includes the apparatus of example 2, wherein the duration value is a first duration value, and the one or more placeholders includes a symbol that is associated with a second duration value of zero.

Example 4 includes the apparatus of example 2, wherein the processor circuitry is to execute the instructions to generate a mel-spectrogram from the expanded representation.

Example 5 includes the apparatus of example 2, the processor circuitry is a neural network accelerator that is independent of an operating system with which the neural network accelerator is associated.

Example 6 includes the apparatus of example 2, wherein the processor circuitry is to train an encoding portion of the neural network based on cross-entropy loss.

Example 7 includes the apparatus of example 2, wherein the processor circuitry is to execute the instructions to train a decoding portion of the neural network based on a structural similarity loss.

Example 8 includes a non-transitory computer readable storage medium comprising instructions which, when executed by processor circuitry, cause the processor circuitry to identify a word in an image, the word to be converted to an audio waveform, encode the word identified in the image into an ordered list of phonemes, and synthesize the audio waveform of the word based on an output of a neural network that determines a duration that a phoneme of the ordered list of phonemes is to be expressed in the audio waveform.

Example 9 includes the non-transitory computer readable medium of example 8, wherein the duration is a duration value, and wherein the instructions, when executed, cause the processor circuitry to pad the ordered list of phonemes with one or more placeholders to generate a fixed-length representation of the word identified in the image, and generate an expanded representation of the fixed-length representation based on the duration value and a dimensionality.

Example 10 includes the non-transitory computer readable medium of example 9, wherein the duration value is a first duration value, and wherein the one or more placeholders includes a symbol that is associated with a second duration value of zero.

Example 11 includes the non-transitory computer readable medium of example 9, wherein the instructions, when executed, cause the processor circuitry to generate a mel-spectrogram from the expanded representation.

Example 12 includes the non-transitory computer readable medium of example 9, wherein the processor circuitry is a neural network accelerator that is independent of an operating system with which the neural network accelerator is associated.

Example 13 includes the non-transitory computer readable medium of example 9 wherein the instructions, when executed, cause the processor circuitry to train an encoding portion of the neural network based on cross-entropy loss.

Example 14 includes a method comprising identifying a word in an image, the word to be converted to an audio waveform, encoding the word identified in the image into an ordered list of phonemes, and synthesizing the audio waveform of the word based on an output of a neural network that determines a duration that a phoneme of the ordered list of phonemes is to be expressed in the audio waveform.

Example 15 includes the method of example 14, wherein the duration is a duration value, and further including padding the ordered list of phonemes with one or more placeholders to generate a fixed-length representation of the word identified in the image, and generating an expanded representation of the fixed-length representation based on the duration value and a dimensionality.

Example 16 includes the method of example 15, wherein the duration value is a first duration value, and the one or more placeholders includes a symbol that is associated with a second duration value of zero.

Example 17 includes the method of example 15, wherein synthesizing the audio waveform of the word based on the expanded representation includes generating a mel-spectrogram.

Example 18 includes the method of example 15, wherein the processor circuitry is a neural network accelerator that is independent of an operating system with which the neural network accelerator is associated.

Example 19 includes the method of example 15, further including training an encoding portion of a neural network based on cross-entropy loss.

Example 20 includes the method of example 15, further including training a decoding portion of a neural network based on a structural similarity loss.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   instructions; and
   processor circuitry to execute the instructions to:
      identify a word in an image, the word to be converted to an audio waveform;
      encode the word identified in the image into an ordered list of phonemes;
      pad the ordered list of phonemes with one or more placeholders to generate a fixed-length representation of the word identified in the image;

determine, at a neural network, a duration that a phoneme of the ordered list of phonemes is to be expressed in the audio waveform, wherein the duration is a duration value;

generate an expanded representation of the fixed-length representation based on the duration value and a dimensionality; and synthesize the audio waveform of the word based on the expanded representation.

2. The apparatus of claim 1, wherein the duration value is a first duration value, and the one or more placeholders includes a symbol that is associated with a second duration value of zero.

3. The apparatus of claim 1, wherein the processor circuitry is to execute the instructions to generate a mel-spectrogram from the expanded representation.

4. The apparatus of claim 1, the processor circuitry is a neural network accelerator that is independent of an operating system with which the neural network accelerator is associated.

5. The apparatus of claim 1, wherein the processor circuitry is to train an encoding portion of the neural network based on cross-entropy loss.

6. The apparatus of claim 1, wherein the processor circuitry is to execute the instructions to train a decoding portion of the neural network based on a structural similarity loss.

7. The apparatus of claim 1, wherein the processor circuitry is to execute the instructions to train a duration prediction portion of the neural network based on mean square error.

8. A non-transitory computer readable storage medium comprising instructions which, when executed by processor circuitry, cause the processor circuitry to:

identify a word in an image, the word to be converted to an audio waveform;

encode the word identified in the image into an ordered list of phonemes;

pad the ordered list of phonemes with one or more placeholders to generate a fixed-length representation of the word identified in the image;

determine, at a neural network, a duration that a phoneme of the ordered list of phonemes is to be expressed in the audio waveform, wherein the duration is a duration value;

generate an expanded representation of the fixed-length representation based on the duration value and a dimensionality; and synthesize the audio waveform of the word based on the expanded representation.

9. The non-transitory computer readable medium of claim 8, wherein the duration value is a first duration value, and wherein the one or more placeholders includes a symbol that is associated with a second duration value of zero.

10. The non-transitory computer readable medium of claim 8, wherein the instructions, when executed, cause the processor circuitry to generate a mel-spectrogram from the expanded representation.

11. The non-transitory computer readable medium of claim 8, wherein the processor circuitry is a neural network accelerator that is independent of an operating system with which the neural network accelerator is associated.

12. The non-transitory computer readable medium of claim 8, wherein the instructions, when executed, cause the processor circuitry to train an encoding portion of the neural network based on cross-entropy loss.

13. The non-transitory computer readable medium of claim 8, wherein the instructions, when executed, cause the processor circuitry to train a decoding portion of the neural network based on a structural similarity loss.

14. A method comprising:

identifying, by executing an instruction with processor circuitry, a word in an image, the word to be converted to an audio waveform;

encoding, by executing an instruction with the processor circuitry, the word identified in the image into an ordered list of phonemes;

pad the ordered list of phonemes with one or more placeholders to generate a fixed-length representation of the word identified in the image;

determine, at a neural network, a duration that a phoneme of the ordered list of phonemes is to be expressed in the audio waveform, wherein the duration is a duration value;

generate an expanded representation of the fixed-length representation based on the duration and a dimensionality; and synthesizing, by executing an instruction with the processor circuitry, the audio waveform of the word based on the expanded representation.

15. The method of claim 14, wherein the duration value is a first duration value, and the one or more placeholders includes a symbol that is associated with a second duration value of zero.

16. The method of claim 14, wherein the synthesizing of the audio waveform of the word based on the expanded representation includes generating a mel-spectrogram.

17. The method of claim 14, wherein the processor circuitry is a neural network accelerator that is independent of an operating system with which the neural network accelerator is associated.

18. The method of claim 14, further including training an encoding portion of the neural network based on cross-entropy loss.

19. The method of claim 14, further including training a decoding portion of the neural network based on a structural similarity loss.

20. The method of claim 14, further including training a duration prediction portion of the neural network based on mean square error.

* * * * *